UNITED STATES PATENT OFFICE.

LEVI HAAS, OF CHESTER, PENNSYLVANIA, ASSIGNOR TO STEPHEN E. HAAS, OF SAME PLACE.

FERTILIZER.

SPECIFICATION forming part of Letters Patent No. 307,718, dated November 4, 1884.

Application filed April 15, 1884. (No specimens.)

*To all whom it may concern:*

Be it known that I, LEVI HAAS, a citizen of the United States of America, residing at Chester, in the county of Delaware and State of Pennsylvania, have invented certain new and useful Improvements in Fertilizers, of which the following is a specification.

My invention pertains to an improvement in fertilizers, as hereinafter described and claimed, its object being not only to cheapen the ordinary cost of production of fertilizing compounds, but also to render its enriching action on the soil, if not inexhaustible, at least far more enduring and continuous than has hitherto been accomplished.

In the process of producing my fertilizer I employ, as a cheap component part of the material, the slag of furnaces, about fifty pounds of which I pulverize. I add thereto sulphate of ammonia composed of about ninety pounds of commercial liquid ammonia and ten pounds of sulphuric acid, by means of which super-phosphates are produced, and the slag is partially disintegrated, the residue thereof remaining for future disintegration by action of materials combined therewith, as hereinafter described; but I do not confine myself strictly to the use of sulphuric acid, as muriatic acid may be employed in this connection as the chemical equivalent thereof. To the partially-decomposed slag I add about ten pounds of ground or pulverized limestone, about fifteen pounds of ground oyster-shells, and ten pounds of ground bone; but as limestone and ground oyster-shells in their action upon the slag are equivalents, when more convenient twenty-five pounds of either one thereof, to the exclusion of the other one, may be employed, thus making an aggregate of eighty-five pounds of material, to which I add a half-pound of nitrate of soda, five pounds of salt, eight pounds of sulphate of soda, and one and a half pound of potash. These component parts are then thoroughly intermixed and blended with a sufficient quantity of land plaster and ground slag, and such part of the slag as is not at first decomposed by the action of the ammonia-and-acid solution and remains intact, is (after the fertilizer has been placed on the soil to be enriched) gradually decomposed by the joint action of the other component parts with which it is blended and that of the elements. The advantage thus gained is that the enriching action of the fertilizer is not exhausted by the absorbent action of one or two crops taken from the soil enriched therewith, as the gradual disintegration of the slag, when combined with the foregoing ingredients, continues to enrich the soil for a greater period than is required for the production of one or more crops.

Having thus fully described my invention, what I claim, and desire to secure by Letters Patent, is—

A fertilizer composed of slag, sulphate of ammonia, limestone or oyster-shells, bone-dust, nitrate of soda, salt, sulphate of soda, potash, and plaster, in or about the proportions substantially as described.

In testimony whereof I affix my signature in presence of two witnesses.

LEVI HAAS.

Witnesses:
M. E. BORDINE,
CHAS. C. LARKIN.